(12) United States Patent
Rogers et al.

(10) Patent No.: US 12,547,237 B1
(45) Date of Patent: Feb. 10, 2026

(54) ARTIFICIAL REALITY INPUT FOR TWO-DIMENSIONAL VIRTUAL OBJECTS

(71) Applicant: Meta Platforms Technologies, LLC, Menlo Park, CA (US)

(72) Inventors: Justin Rogers, Clyde Hill, WA (US); Todd Harris, Woodinville, WA (US); Nathan Furtwangler, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/166,805

(22) Filed: Feb. 9, 2023

Related U.S. Application Data

(60) Provisional application No. 63/380,600, filed on Oct. 24, 2022.

(51) Int. Cl.
*G06F 3/01* (2006.01)
*G06F 3/0484* (2022.01)

(52) U.S. Cl.
CPC .............. *G06F 3/011* (2013.01); *G06F 3/017* (2013.01); *G06F 3/0484* (2013.01)

(58) Field of Classification Search
CPC ......... G06F 3/011; G06F 3/017; G06F 3/0484
See application file for complete search history.

(56) References Cited

U.S. PATENT DOCUMENTS

| 770,149 | A | 9/1904 | Bailey |
| 6,842,175 | B1 | 1/2005 | Schmalstieg et al. |

(Continued)

FOREIGN PATENT DOCUMENTS

| CN | 101996077 A | 3/2011 |
| EP | 2887322 B1 | 2/2020 |

(Continued)

OTHER PUBLICATIONS

Game Ui Examples: "[VR] Half Life Alyx Menu/Settings/UI," Feb. 27, 2021, 2 pages, retrieved from the Internet URL: https://www.youtube.com/watch?v=-iNR-J2whJQ&t=7s.

(Continued)

*Primary Examiner* — Robert J Michaud
(74) *Attorney, Agent, or Firm* — Potomac Law Group, PLLC; Dannon G. Allbee

(57) ABSTRACT

Aspects of the present disclosure are directed to translating artificial reality input for two-dimensional virtual objects. Implementations immerse a user in a three-dimensional artificial reality environment via an artificial reality system. Colliders are artificiality reality device environment interaction components, such as a rays, cones, virtual user hands, etc. Implementations of an input translator detect artificial reality device collider interactions with two-dimensional virtual objects and translate the artificial reality inputs into input that is compatible with the two-dimensional virtual object, such as two-dimensional coordinates, button actions, scroll actions, and the like. For example, the two-dimensional virtual objects can be display content for an application executing at the artificial reality system. Implementation can translate the artificial reality input into two-dimensional coordinates at the virtual object and/or application level actions and/or events (e.g., cursor movement, virtual button pushes, etc.).

20 Claims, 10 Drawing Sheets

(56) References Cited

U.S. PATENT DOCUMENTS

| | | |
|---|---|---|
| 7,650,575 B2 | 1/2010 | Cummins et al. |
| 7,701,439 B2 | 4/2010 | Hillis et al. |
| 8,335,991 B2 | 12/2012 | Douceur et al. |
| 8,424,075 B1 | 4/2013 | Walsh et al. |
| D683,749 S | 6/2013 | Hally |
| D689,874 S | 9/2013 | Brinda et al. |
| 8,558,759 B1 | 10/2013 | Prada Gomez et al. |
| 8,947,351 B1 | 2/2015 | Noble |
| D726,219 S | 4/2015 | Chaudhri et al. |
| D727,352 S | 4/2015 | Ray et al. |
| D727,354 S | 4/2015 | Park et al. |
| 9,055,404 B2 | 6/2015 | Setlur et al. |
| D733,740 S | 7/2015 | Lee et al. |
| 9,081,177 B2 | 7/2015 | Wong et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| 9,530,252 B2 | 12/2016 | Poulos et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| 10,127,290 B1 | 11/2018 | Armstrong et al. |
| D835,665 S | 12/2018 | Kimura et al. |
| 10,168,768 B1 | 1/2019 | Kinstner |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,403,050 B1 | 9/2019 | Beall et al. |
| 10,473,935 B1 | 11/2019 | Gribetz et al. |
| 10,477,104 B1 | 11/2019 | Roessler |
| 10,504,277 B1 | 12/2019 | Haitani et al. |
| 10,521,944 B2 | 12/2019 | Sareen et al. |
| 10,592,064 B2 | 3/2020 | Ames et al. |
| 10,665,019 B2 | 5/2020 | Hildreth et al. |
| D888,071 S | 6/2020 | Wilberding |
| 10,713,831 B2 | 7/2020 | Arana et al. |
| D900,123 S | 10/2020 | Lopes |
| 10,796,489 B1 | 10/2020 | Cordes et al. |
| 10,867,450 B2 | 12/2020 | Todeschini |
| D908,713 S | 1/2021 | Fremine et al. |
| D910,655 S | 2/2021 | Matthewman et al. |
| D910,660 S | 2/2021 | Chaturvedi et al. |
| 10,909,762 B2 | 2/2021 | Karalis et al. |
| 10,916,220 B2 | 2/2021 | Ngo |
| 10,948,997 B1 | 3/2021 | Victor-Faichney et al. |
| 10,963,144 B2 | 3/2021 | Fox et al. |
| 10,987,573 B2 | 4/2021 | Nietfeld et al. |
| 11,023,096 B2 | 6/2021 | Schneider et al. |
| 11,086,476 B2 | 8/2021 | Inch et al. |
| 11,087,029 B1 | 8/2021 | Satpathy |
| 11,087,529 B2 | 8/2021 | Yeung et al. |
| 11,126,320 B1 | 9/2021 | Thompson et al. |
| 11,132,066 B1 | 9/2021 | Blachly et al. |
| 11,132,827 B2 | 9/2021 | Gladkov et al. |
| 11,164,378 B1 | 11/2021 | Cowen et al. |
| 11,176,755 B1 | 11/2021 | Tichenor et al. |
| 11,238,664 B1 | 2/2022 | Tavakoli et al. |
| 11,380,021 B2 | 7/2022 | Nakata |
| 11,520,707 B2 | 12/2022 | Satpathy et al. |
| 11,556,169 B2 | 1/2023 | Wallen et al. |
| 11,556,220 B1 | 1/2023 | Inch et al. |
| 11,676,351 B1 | 6/2023 | Yang et al. |
| 11,755,180 B1 | 9/2023 | Edelblut et al. |
| 11,836,205 B2 | 12/2023 | Inch et al. |
| 11,928,314 B2 | 3/2024 | Edelblut et al. |
| 11,947,862 B1 | 4/2024 | Lindo et al. |
| 12,008,717 B2 | 6/2024 | Noris et al. |
| 12,236,540 B2 | 2/2025 | Estany Rodriguez et al. |
| 12,444,152 B1 | 10/2025 | Forbes et al. |
| 2002/0073043 A1 | 6/2002 | Herman et al. |
| 2003/0179231 A1 | 9/2003 | Kamiwada et al. |
| 2005/0060661 A1 | 3/2005 | Kawahara et al. |
| 2008/0089587 A1 | 4/2008 | Kim et al. |
| 2008/0155118 A1 | 6/2008 | Glaser et al. |
| 2009/0103780 A1 | 4/2009 | Nishihara et al. |
| 2009/0279784 A1 | 11/2009 | Arcas et al. |
| 2009/0313299 A1 | 12/2009 | Bonev et al. |
| 2010/0005424 A1 | 1/2010 | Sundaresan et al. |
| 2010/0050219 A1 | 2/2010 | Angiolillo et al. |
| 2010/0070859 A1 | 3/2010 | Shuster et al. |
| 2010/0083112 A1 | 4/2010 | Dawson et al. |
| 2010/0169837 A1 | 7/2010 | Hyndman |
| 2010/0208033 A1 | 8/2010 | Edge et al. |
| 2010/0251177 A1 | 9/2010 | Geppert et al. |
| 2010/0306716 A1 | 12/2010 | Perez |
| 2010/0332996 A1 | 12/2010 | Sarkaria |
| 2010/0332997 A1 | 12/2010 | Hamilton et al. |
| 2011/0055090 A1 | 3/2011 | Ross |
| 2011/0144970 A1 | 6/2011 | Jiang et al. |
| 2011/0161843 A1 | 6/2011 | Bennett et al. |
| 2011/0164269 A1 | 7/2011 | Kamishiro |
| 2011/0267265 A1 | 11/2011 | Stinson |
| 2011/0276477 A1 | 11/2011 | Shuster |
| 2011/0302535 A1 | 12/2011 | Clerc et al. |
| 2012/0069168 A1 | 3/2012 | Huang et al. |
| 2012/0115122 A1 | 5/2012 | Bruce et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0249797 A1 | 10/2012 | Haddick et al. |
| 2012/0275686 A1 | 11/2012 | Wilson et al. |
| 2012/0293544 A1 | 11/2012 | Miyamoto et al. |
| 2013/0044128 A1 | 2/2013 | Liu et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0141419 A1 | 6/2013 | Mount et al. |
| 2013/0141428 A1 | 6/2013 | Gipson |
| 2013/0147793 A1 | 6/2013 | Jeon et al. |
| 2013/0169682 A1 | 7/2013 | Novak et al. |
| 2013/0178257 A1 | 7/2013 | Langseth |
| 2013/0179761 A1 | 7/2013 | Cho et al. |
| 2013/0265220 A1 | 10/2013 | Fleischmann et al. |
| 2014/0019609 A1 | 1/2014 | Williams et al. |
| 2014/0037218 A1 | 2/2014 | Zweig et al. |
| 2014/0125598 A1 | 5/2014 | Cheng et al. |
| 2014/0149901 A1 | 5/2014 | Hunter |
| 2014/0200084 A1 | 7/2014 | Butler et al. |
| 2014/0236996 A1 | 8/2014 | Masuko et al. |
| 2014/0268065 A1 | 9/2014 | Ishikawa et al. |
| 2014/0316990 A1 | 10/2014 | Winston |
| 2014/0357366 A1 | 12/2014 | Koganezawa et al. |
| 2014/0375683 A1 | 12/2014 | Salter et al. |
| 2014/0375691 A1 | 12/2014 | Kasahara |

(56) References Cited

U.S. PATENT DOCUMENTS

| | | |
|---|---|---|
| 2014/0378022 A1 | 12/2014 | Muthyala et al. |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0094142 A1 | 4/2015 | Stafford |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0179147 A1 | 6/2015 | Rezaiifar et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0293666 A1 | 10/2015 | Lee et al. |
| 2015/0356774 A1 | 12/2015 | Gal et al. |
| 2015/0371441 A1 | 12/2015 | Shim |
| 2016/0026253 A1 | 1/2016 | Bradski et al. |
| 2016/0044298 A1 | 2/2016 | Holz et al. |
| 2016/0062618 A1 | 3/2016 | Fagan et al. |
| 2016/0093108 A1 | 3/2016 | Mao et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0173359 A1 | 6/2016 | Brenner et al. |
| 2016/0180590 A1 | 6/2016 | Kamhi et al. |
| 2016/0378291 A1 | 12/2016 | Pokrzywka |
| 2017/0003750 A1 | 1/2017 | Li |
| 2017/0031503 A1 | 2/2017 | Rosenberg et al. |
| 2017/0039770 A1 | 2/2017 | Lanier et al. |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0206691 A1 | 7/2017 | Harrises et al. |
| 2017/0214782 A1 | 7/2017 | Brinda |
| 2017/0236196 A1 | 8/2017 | Isaacson et al. |
| 2017/0236320 A1 | 8/2017 | Gribetz et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0308608 A1 | 10/2017 | Freeman |
| 2017/0311129 A1 | 10/2017 | Lopez-Uricoechea et al. |
| 2017/0316606 A1 | 11/2017 | Khalid et al. |
| 2017/0323488 A1 | 11/2017 | Mott et al. |
| 2017/0336951 A1 | 11/2017 | Palmaro |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0024623 A1 | 1/2018 | Faaborg et al. |
| 2018/0040044 A1 | 2/2018 | Mattingly et al. |
| 2018/0053351 A1 | 2/2018 | Anderson |
| 2018/0059901 A1 | 3/2018 | Gullicksen |
| 2018/0059902 A1 | 3/2018 | Martin |
| 2018/0075659 A1 | 3/2018 | Browy et al. |
| 2018/0091304 A1 | 3/2018 | Brook et al. |
| 2018/0095616 A1 | 4/2018 | Valdivia et al. |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0143757 A1 | 5/2018 | Champion et al. |
| 2018/0144556 A1 | 5/2018 | Champion et al. |
| 2018/0189647 A1 | 7/2018 | Calvo et al. |
| 2018/0207522 A1 | 7/2018 | Roman et al. |
| 2018/0288391 A1 | 10/2018 | Lee et al. |
| 2018/0293802 A1 | 10/2018 | Hendricks et al. |
| 2018/0300557 A1 | 10/2018 | Rodenas et al. |
| 2018/0307303 A1 | 10/2018 | Powderly et al. |
| 2018/0322674 A1 | 11/2018 | Du |
| 2018/0322701 A1 | 11/2018 | Pahud et al. |
| 2018/0329718 A1 | 11/2018 | Klein et al. |
| 2018/0335925 A1 | 11/2018 | Hsiao et al. |
| 2018/0342106 A1 | 11/2018 | Rosado |
| 2018/0349690 A1 | 12/2018 | Rhee et al. |
| 2018/0357780 A1 | 12/2018 | Young et al. |
| 2018/0361258 A1 | 12/2018 | Malyuk |
| 2019/0005716 A1 | 1/2019 | Singh et al. |
| 2019/0005724 A1 | 1/2019 | Pahud et al. |
| 2019/0026936 A1 | 1/2019 | Gorur Sheshagiri et al. |
| 2019/0035152 A1 | 1/2019 | Kazansky |
| 2019/0065027 A1 | 2/2019 | Hauenstein et al. |
| 2019/0088030 A1 | 3/2019 | Masterson et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0121522 A1 | 4/2019 | Davis et al. |
| 2019/0139321 A1 | 5/2019 | Kocharlakota et al. |
| 2019/0155481 A1 | 5/2019 | Diverdi et al. |
| 2019/0172262 A1 | 6/2019 | McHugh et al. |
| 2019/0197780 A1 | 6/2019 | Rao |
| 2019/0197785 A1 | 6/2019 | Tate-Gans et al. |
| 2019/0213792 A1 | 7/2019 | Jakubzak et al. |
| 2019/0236842 A1 | 8/2019 | Bennett et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0279430 A1 | 9/2019 | Todeschini |
| 2019/0286231 A1 | 9/2019 | Burns et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0304166 A1 | 10/2019 | Yu et al. |
| 2019/0306137 A1 | 10/2019 | Isaacson et al. |
| 2019/0310757 A1 | 10/2019 | Lee et al. |
| 2019/0317965 A1 | 10/2019 | Remis et al. |
| 2019/0340818 A1 | 11/2019 | Furtwangler |
| 2019/0340833 A1 | 11/2019 | Furtwangler et al. |
| 2019/0347762 A1 | 11/2019 | Hwang et al. |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0385372 A1 | 12/2019 | Cartwright et al. |
| 2020/0020165 A1 | 1/2020 | Tran et al. |
| 2020/0050289 A1 | 2/2020 | Hardie-Bick et al. |
| 2020/0051527 A1 | 2/2020 | Ngo |
| 2020/0066047 A1 | 2/2020 | Karalis et al. |
| 2020/0082629 A1 | 3/2020 | Jones et al. |
| 2020/0089390 A1 | 3/2020 | Bakhash |
| 2020/0097077 A1 | 3/2020 | Nguyen et al. |
| 2020/0097091 A1 | 3/2020 | Chou et al. |
| 2020/0111260 A1 | 4/2020 | Osborn et al. |
| 2020/0151965 A1 | 5/2020 | Forbes et al. |
| 2020/0174584 A1 | 6/2020 | Schliemann et al. |
| 2020/0193649 A1 | 6/2020 | Moon et al. |
| 2020/0210127 A1 | 7/2020 | Browy |
| 2020/0218342 A1 | 7/2020 | Murali et al. |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226820 A1 | 7/2020 | Stachniak et al. |
| 2020/0241730 A1 | 7/2020 | Diverdi et al. |
| 2020/0245017 A1 | 7/2020 | Ganschow et al. |
| 2020/0258278 A1 | 8/2020 | Mirhosseini et al. |
| 2020/0279044 A1 | 9/2020 | Lum et al. |
| 2020/0285761 A1 | 9/2020 | Buck et al. |
| 2020/0285977 A1 | 9/2020 | Brebner |
| 2020/0293178 A1 | 9/2020 | Kumar et al. |
| 2020/0294097 A1 | 9/2020 | Spivack et al. |
| 2020/0302680 A1 | 9/2020 | Yip et al. |
| 2020/0320794 A1 | 10/2020 | Huang et al. |
| 2020/0351273 A1 | 11/2020 | Thomas |

(56) References Cited

U.S. PATENT DOCUMENTS

| | | |
|---|---|---|
| 2020/0363924 A1 | 11/2020 | Flexman et al. |
| 2020/0363930 A1 | 11/2020 | Srinivasan et al. |
| 2020/0401687 A1 | 12/2020 | Mak |
| 2021/0005022 A1 | 1/2021 | Oser et al. |
| 2021/0011556 A1 | 1/2021 | Atlas et al. |
| 2021/0012113 A1 | 1/2021 | Petill et al. |
| 2021/0014408 A1 | 1/2021 | Timonen et al. |
| 2021/0089639 A1 | 3/2021 | Remillet et al. |
| 2021/0090333 A1 | 3/2021 | Ravasz et al. |
| 2021/0097768 A1 | 4/2021 | Malia et al. |
| 2021/0103447 A1 | 4/2021 | Wei et al. |
| 2021/0104100 A1 | 4/2021 | Whitney et al. |
| 2021/0124475 A1 | 4/2021 | Inch et al. |
| 2021/0168324 A1 | 6/2021 | Ngo |
| 2021/0192856 A1 | 6/2021 | Lee |
| 2021/0201029 A1 | 7/2021 | Ju et al. |
| 2021/0252392 A1 | 8/2021 | Stevens |
| 2021/0256769 A1 | 8/2021 | Bailey et al. |
| 2021/0271370 A1 | 9/2021 | Williams et al. |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0329044 A1 | 10/2021 | Sommer et al. |
| 2021/0343182 A1 | 11/2021 | Lu |
| 2021/0358201 A1 | 11/2021 | Cady et al. |
| 2021/0375065 A1 | 12/2021 | Cannefax et al. |
| 2021/0390765 A1 | 12/2021 | Laaksonen et al. |
| 2021/0398095 A1 | 12/2021 | Mallett et al. |
| 2022/0036447 A1 | 2/2022 | Spivack et al. |
| 2022/0084279 A1 | 3/2022 | Lindmeier et al. |
| 2022/0091722 A1* | 3/2022 | Faulkner ............... G06T 19/003 |
| 2022/0101612 A1 | 3/2022 | Palangie et al. |
| 2022/0121344 A1 | 4/2022 | Pastrana Vicente et al. |
| 2022/0139052 A1 | 5/2022 | Tavakoli et al. |
| 2022/0207830 A1 | 6/2022 | Allen et al. |
| 2022/0214743 A1 | 7/2022 | Dascola et al. |
| 2022/0253125 A1 | 8/2022 | Wallen et al. |
| 2022/0254114 A1 | 8/2022 | Frederick et al. |
| 2022/0254120 A1 | 8/2022 | Berliner et al. |
| 2022/0269888 A1 | 8/2022 | Stoeva et al. |
| 2022/0292543 A1 | 9/2022 | Henderson |
| 2022/0308716 A1 | 9/2022 | Rice |
| 2022/0326837 A1 | 10/2022 | Dessero et al. |
| 2022/0326967 A1 | 10/2022 | Khan et al. |
| 2022/0335694 A1 | 10/2022 | Bouazizi et al. |
| 2022/0387873 A1 | 12/2022 | Hall et al. |
| 2022/0392093 A1 | 12/2022 | Poulad et al. |
| 2022/0414487 A1 | 12/2022 | Si et al. |
| 2023/0050933 A1* | 2/2023 | Xiao ...................... G06T 19/00 |
| 2023/0092103 A1 | 3/2023 | Puyol et al. |
| 2023/0092282 A1 | 3/2023 | Boesel et al. |
| 2023/0120052 A1 | 4/2023 | Wallen et al. |
| 2023/0152936 A1 | 5/2023 | Inch et al. |
| 2023/0171438 A1 | 6/2023 | Liu et al. |
| 2023/0206571 A1 | 6/2023 | Darling et al. |
| 2023/0237192 A1 | 7/2023 | Kahan et al. |
| 2023/0245350 A1 | 8/2023 | Webber et al. |
| 2023/0260233 A1 | 8/2023 | Goncalves et al. |
| 2023/0325896 A1 | 10/2023 | Luker |
| 2023/0410449 A1 | 12/2023 | Shirai |
| 2023/0419617 A1 | 12/2023 | Krenn et al. |
| 2023/0419618 A1 | 12/2023 | Krenn et al. |
| 2024/0061545 A1 | 2/2024 | Gu et al. |
| 2024/0070215 A1 | 2/2024 | Inch et al. |
| 2024/0073489 A1 | 2/2024 | Hopmann |
| 2024/0112409 A1 | 4/2024 | Cross et al. |
| 2024/0152244 A1 | 5/2024 | Dedonato et al. |
| 2024/0152245 A1 | 5/2024 | Broughton et al. |
| 2024/0160337 A1 | 5/2024 | Edelblut et al. |
| 2024/0176839 A1 | 5/2024 | Chrysanthou |
| 2024/0303932 A1 | 9/2024 | Noris et al. |
| 2024/0331331 A1 | 10/2024 | Goncalves et al. |
| 2025/0265776 A1 | 8/2025 | Esquivel et al. |

FOREIGN PATENT DOCUMENTS

| | | |
|---|---|---|
| EP | 3719616 A1 | 10/2020 |
| JP | 2001325616 A | 11/2001 |
| JP | 2009140294 A | 6/2009 |
| JP | 2014071498 A | 4/2014 |
| JP | 2018109835 A | 7/2018 |
| KR | 20170126362 A | 11/2017 |
| WO | 2018235371 A1 | 12/2018 |
| WO | 2020226832 A1 | 11/2020 |
| WO | 2022006661 A1 | 1/2022 |
| WO | 2022055822 A1 | 3/2022 |
| WO | 2022170222 A1 | 8/2022 |
| WO | 2022223113 A1 | 10/2022 |
| WO | 2023102139 A1 | 6/2023 |
| WO | 2024085996 A1 | 4/2024 |

OTHER PUBLICATIONS

International Search Report and Written Opinion for International Application No. PCT/US2023/033526, mailed Dec. 1, 2023, 13 pages.

Broitman A., "Learn and Do More with Lens in Google Images," Oct. 25, 2018, Retrieved from the Internet: URL: https://www.blog.google/products/search/learn-and-do-more-lens-google-images/ , 4 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Search Report and Written Opinion for International Application No. PCT/US2020/051763, mailed Feb. 3, 2021, 11 Pages.

International Search Report and Written Opinion for International Application No. PCT/US2022/032288, mailed Sep. 16, 2022, 11 pages.

Invitation to Pay Additional Fees for International Application No. PCT/US2021/044098, Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens App," May 28, 2019, Retrieved from the Internet: URL: https://vrscout.com/news/new-ar-features-google-lens/ , 3 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

International Preliminary Report on Patentability for International Application No. PCT/US2023/033526, mailed May 1, 2025, 11 pages.

International Preliminary Report on Patentability for International Application No. PCT/US2023/035591, mailed May 1, 2025, 8 pages.

International Preliminary Report on Patentability for International Application No. PCT/US2023/34229, mailed May 8, 2025, 09 pages.

International Search Report and Written Opinion for International Application No. PCT/US2023/035591, mailed Feb. 19, 2025, 10 pages.

(56) References Cited

OTHER PUBLICATIONS

International Search Report and Written Opinion for International Application No. PCT/US2023/34229, mailed Dec. 1, 2023, 10 pages.
Tyriel Wood—Vr Tech: "Multitasking in VR w/ Oculus Core 2.0 Oculus Dash First Impression," Dec. 8, 2017, XP093126606, Retrieved from the Internet: URL:https://www.youtube.com/watch?v=s8EwXluCqEY [retrieved on Feb. 1, 2024], 3 pages.
25MSR., "Build 2016 HoloLens Building UWP 2D Apps for Microsoft HoloLens," Apr. 17, 2016, 1 page, Retrieved from the Internet: URL: https://www.youtube.com/watch?v=XlqSXWKh0b4 [retrieved on Nov. 22, 2023].
Bhattacharyya A., "Reimagining the Internet: This Browser Allows Users to View Websites in 3D," Hindustan Times, Toronto, Jul. 11, 2017, pp. 1-8, Retrieved from Internet URL: https://www.hindustantimes.com/world-news/this-browser-allows-users-to-view-websites-in-3d/ story-ts6MPeGeuEAGdR8b7cPleL.html.
Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-wi nter/Handouts/chen-medioni-align-rob91.pdf.
David H., "Oculus Developer Hub can now Launch WebXR URLs on Your Quest," uploadvr.com, Dec. 4, 2021, 2 pages, Retrieved from the Internet: https://web.archive.org/web/20211204181804/https://www.uploadvr.com/oculus-developer-hu b-we b- u rl s- m etri cs/.
Foxman M., et al., "United We Stand: Platforms, Tools and Innovation with the Unity Game Engine," Social Media Society, Nov. 21, 2019, 10 pages.
International Preliminary Report on Patentability for International Application No. PCT/US2020/052976, mailed May 5, 2022, 9 pages.
International Preliminary Report on Patentability for International Application No. PCT/US2023/017413, mailed Oct. 17, 2024, 10 pages.
International Preliminary Report on Patentability for International Application No. PCT/US2023/018759, mailed Oct. 31, 2024, 8 pages.
International Preliminary Report on Patentability for International Application No. PCT/US2023/025680, mailed Jan. 2, 2025, 10 pages.
International Preliminary Report on Patentability for International Application No. PCT/US2023/025685, mailed Jan. 2, 2025, 7 pages.
International Preliminary Report on Patentability for International Application No. PCT/US2023/032524, mailed Apr. 10, 2025, 8 pages.
International Preliminary Report on Patentability for International Application No. PCT/US2023/083269, mailed Jul. 10, 2025, 10 pages.
International Search Report and Written Opinion for International Application No. PCT/US2020/052976, mailed Dec. 11, 2020, 10 Pages.
International Search Report and Written Opinion for International Application No. PCT/US2021/064674, mailed Apr. 19, 2022, 13 pages.
International Search Report and Written Opinion for International Application No. PCT/US2022/016110, mailed Apr. 29, 2022, 12 pages.
International Search Report and Written Opinion for International Application No. PCT/US2023/017413, mailed Jul. 4, 2023, 12 pages.
International Search Report and Written Opinion for International Application No. PCT/US2023/018759, mailed Jun. 14, 2023, 9 pages.
International Search Report and Written Opinion for International Application No. PCT/US2023/025680, mailed Sep. 8, 2023, 11 pages.
International Search Report and Written Opinion for International Application No. PCT/US2023/025685, mailed Oct. 5, 2023, 9 pages.
International Search Report and Written Opinion for International Application No. PCT/US2023/030469, mailed Nov. 20, 2023, 12 pages.
International Search Report and Written Opinion for International Application No. PCT/US2023/032524, mailed Nov. 16, 2023, 9 pages.
International Search Report and Written Opinion for International Application No. PCT/US2023/083269, mailed Apr. 2, 2024, 13 pages.
Katz N., et al., "Extending Web Browsers with a Unity 3D-Based Virtual Worlds Viewer," IEEE Computer Society, Sep./Oct. 2011, vol. 15 (5), pp. 15-21.
Milborrow S., "Active Shape Models with Stasm," [Retrieved on Sep. 20, 2022], 3 pages, Retrieved from the internet: URL http://www.milbo.users.sonic.net/stasm/.
Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.
MRPT: "Ransac C++ Examples," 2014, 6 pages, Retrieved from the internet: URL: https://www.mrpt.org/tutorials/programming/maths-and-geometry/ransac-c-examples/.
Oculus VR., "Oculus Developer Hub Update 1.8," Oculus, 5 pages, Jun. 22, 2021, Retrieved from the Internet: https://web.archive.Org/web/20210622003501/https://developer.oculus.com/blog/oculus-developer-hub-update-18/.
Office Action mailed Jan. 7, 2025 for Japanese Patent Application No. 2022-500566, filed on Sep. 27, 2020, 3 pages.
Office Action mailed Nov. 8, 2023 for European Patent Application No. 20789416.3, filed on Sep. 27, 2020, 4 pages.
Office Action mailed Apr. 11, 2025 for Korean Application No. 10-2022-7017084, filed Sep. 27, 2020, 6 pages.
Office Action mailed Mar. 14, 2024 for Chinese Application No. 202080057590.5, filed Sep. 27, 2020, 9 pages.
Office Action mailed Jul. 30, 2024 for Japanese Patent Application No. 2022-500566, filed on Sep. 27, 2020, 7 pages.
Orland K., "So What is the "Metaverse," Exactly?," ars Technica, Dec. 7, 2021 [Retrieved on Jun. 16, 2023], pp. 1-14, Retrieved from the Internet: https://web.archive.Org/web/20220407114023/https://arstechnica.com/gaming/2021/11/everyone-pitching-the-metaverse-has-a-different-idea-of-what-it-is/.
Qiao X., et al., "Web AR: A Promising Future for Mobile Augmented Reality—State of the Art. Challenges, and Insights," Proceedings of the IEEE, Apr. 2019, vol. 107 (4), pp. 651-666.
Srinivasa R.R., "Augmented Reality Adaptive Web Content," 13th IEEE Annual Consumer Communications & Networking Conference (CCNC), 2016, pp. 1-4.
Trademark U.S. Appl. No. 73/289,805, filed Dec. 15, 1980,1 page.
Trademark U.S. Appl. No. 73/560,027, filed Sep. 25, 1985,1 page.
Trademark U.S. Appl. No. 74/155,000, filed Apr. 8, 1991,1 page.
Trademark U.S. Appl. No. 76/036,844, filed Apr. 28, 2000, 1 page.
Webxr: "WebXR Device API Explained," Aug. 23, 2021, 31 pages, Retrieved from the Internet URL: https://web.archive. Org/web/20210823211837/https://immersive-web.github.io/webxr/explainer.html#objectdata-visualization.
Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.
Wikipedia: "Canny Edge Detector," [Retrieved on Sep. 20, 2022], 10 pages, Retrieved from the internet: URL: https://en.wi ki pedia.org/wiki/Canny_edge_detector.
Wikipedia: "Iterative Closest Point," [Retrieved on Sep. 20, 2022], 3 pages, Retrieved from the internet: URL: https://en.wikipedia.org/wiki/Iterative_closest_point.
YouTube: "V1 VR Art Gallery is Live! OnCyber.xyz/ArtisMyWeapon," Art is My Weapon, Jan. 19, 2022, 2 pages,

(56) References Cited

OTHER PUBLICATIONS

Retrieved from the Internet URL: https://www.youtube.com/watch?v=BMfLjrkpGb0.

* cited by examiner

ARTIFICIAL REALITY INPUT FOR TWO-DIMENSIONAL VIRTUAL OBJECTS

CROSS-REFERENCE TO RELATED APPLICATIONS

This application claims priority to U.S. Provisional Application No. 63/380,600, titled "Artificial Reality Input For Two-Dimensional Virtual Objects," filed Oct. 24, 2022., which is herein incorporated by reference in their entirety.

The present disclosure is directed to translating artificial reality input for two-dimensional virtual objects.

BACKGROUND

The variety in which users interact with computing systems has grown over time. For example, artificial reality systems can include controller-based interactions, interactions via eye tracking, interactions based on input from movement sensors, among others. Because these techniques create new ways for users to provide input to computing systems, interpreting these inputs has become meaningful. For example, the way a computing system interprets user inputs to implement functions (i.e., perform changes to a display provided to the user) can have a significant impact on user experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
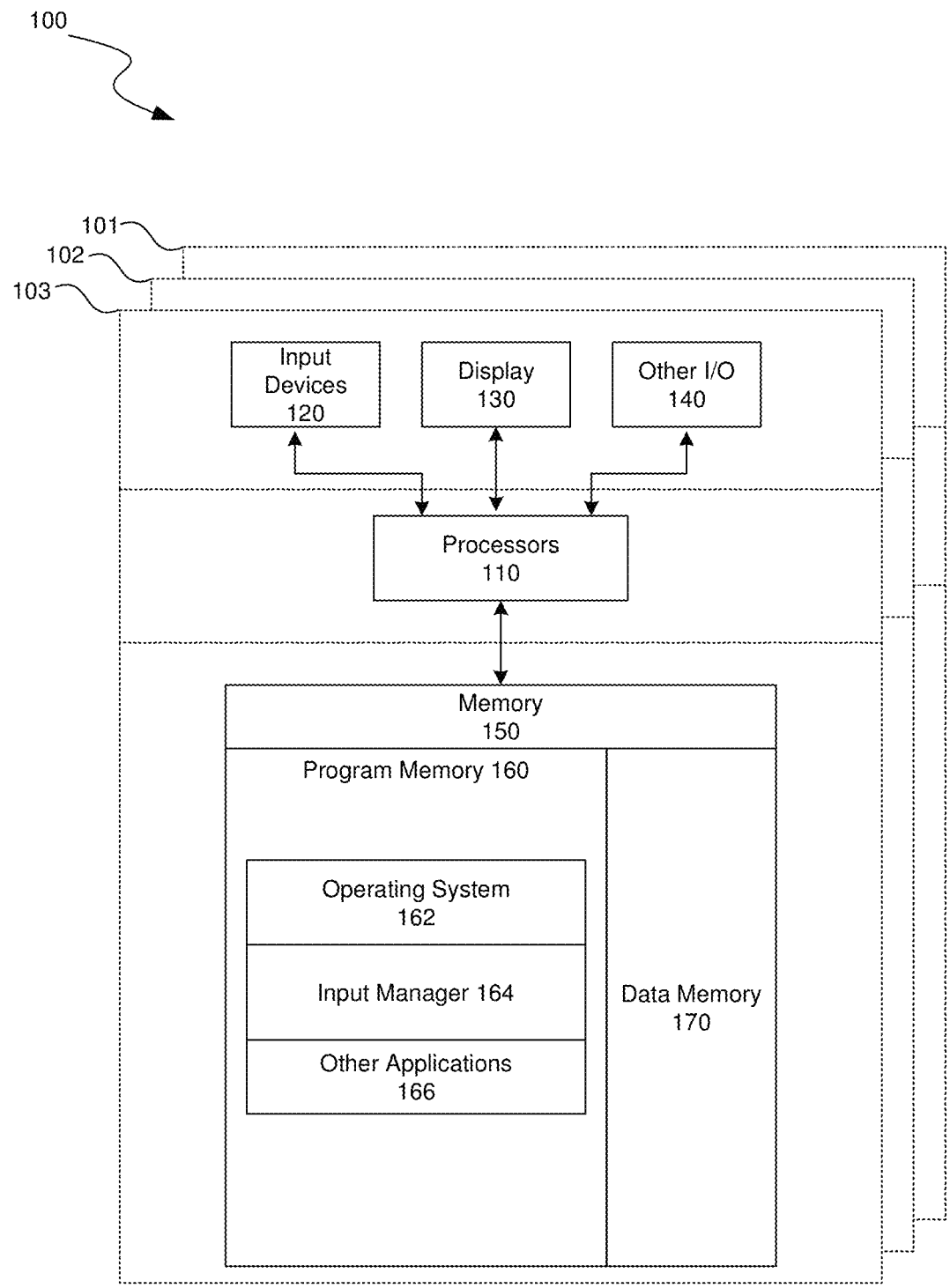
FIG. 1 is a block diagram illustrating an overview of devices on which some implementations of the present technology can operate.

Aspects of the present disclosure are directed to translating artificial reality input for two-dimensional virtual objects. Implementations immerse a user in a three-dimensional artificial reality environment via an artificial reality system. Colliders are artificiality reality device environment interaction components, such as a rays, cones, virtual user hands, etc. Implementations of an input translator detect artificial reality device collider interactions with two-dimensional virtual objects and translate the artificial reality inputs into input that is compatible with the two-dimensional virtual object, such as two-dimensional coordinates, button clicks, scroll actions, and the like.

In some implementations, an executing system shell that is part of the artificial reality system can manage the artificial reality input. For example, the input translator can be part of the system shell. In other examples the input translator can be a separate component from the system shell. In some implementations, the two-dimensional virtual object can be the display component for an executing software application that is different from (e.g., remote from) the executing system shell. For example, the executing application can be a web browser, music player, video player, social media application, messaging or other communication application, a third-party application, or any other suitable application. The two-dimensional virtual object can display content for the executing application and provide a display component that can receive input for the executing application.

Implementations of the input translator can translate artificial realty input into cursor movement at the two-dimensional virtual object and/or triggered application events for the executing application. For example, the executing system shell can translate the input into mapped application programming interface (API) call(s) and pass application event information to the executing application via the API calls. Example application events include application functionality in response to a virtual button press, a scroll action, movement of a display component of the two-dimensional virtual object (e.g., movement of a slider), or any other suitable application functionality related to a two-dimensional virtual object (e.g., panel functions).

In an example, implementations of the input translator can detect a collision between a ray cast from an artificial reality device (and/or the user's body) and a two-dimensional virtual object and translate the input into one or more of a button press at a two-dimensional coordinate on the two-dimensional virtual object, a scroll action that targets a display component on the two-dimensional virtual object, or any other suitable application functionality. In another example, implementations of the input translator can detect a user pinch gesture or other hand gesture mapped to a selection action (e.g., API call that raises a selection action) and translate the input to trigger one or more application events at the executing application, such as application functionality in response to a button press, scroll, and the like.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that translate artificial reality input for two-dimensional virtual objects. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, input manager 164, and other application programs 166. Memory 150 can also include data memory 170 that can include, e.g., sensor data, virtual object data, application data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
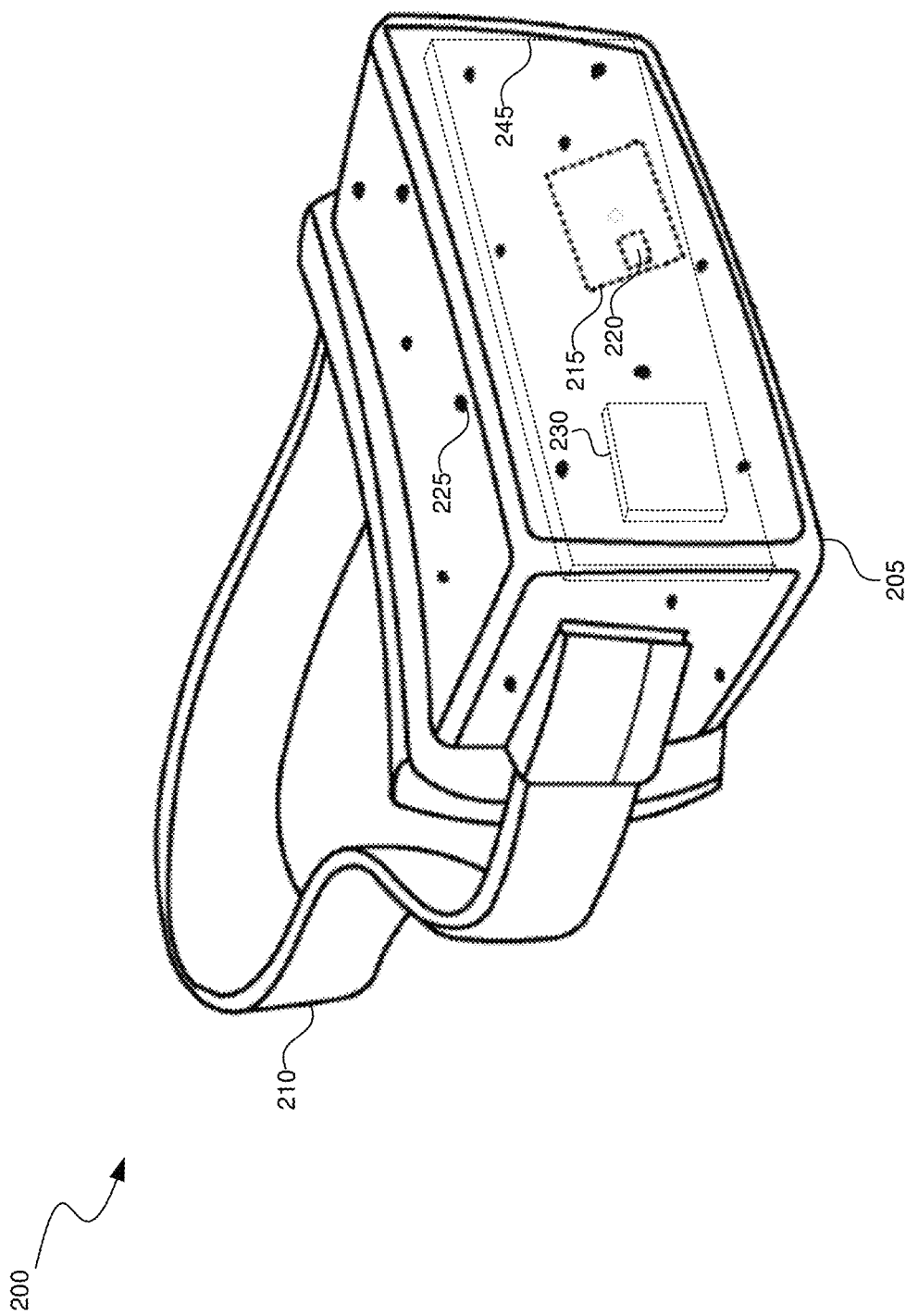
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
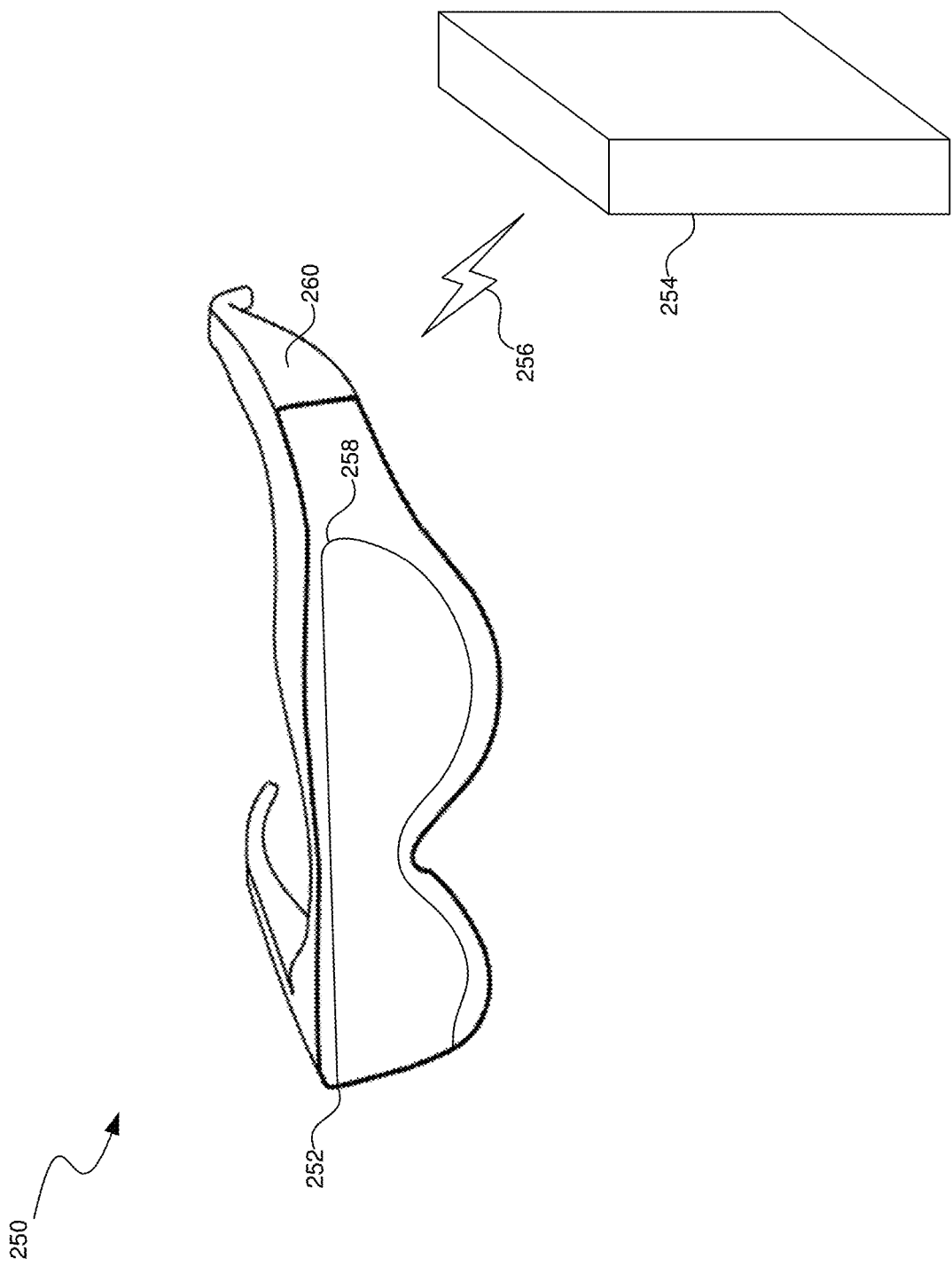
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
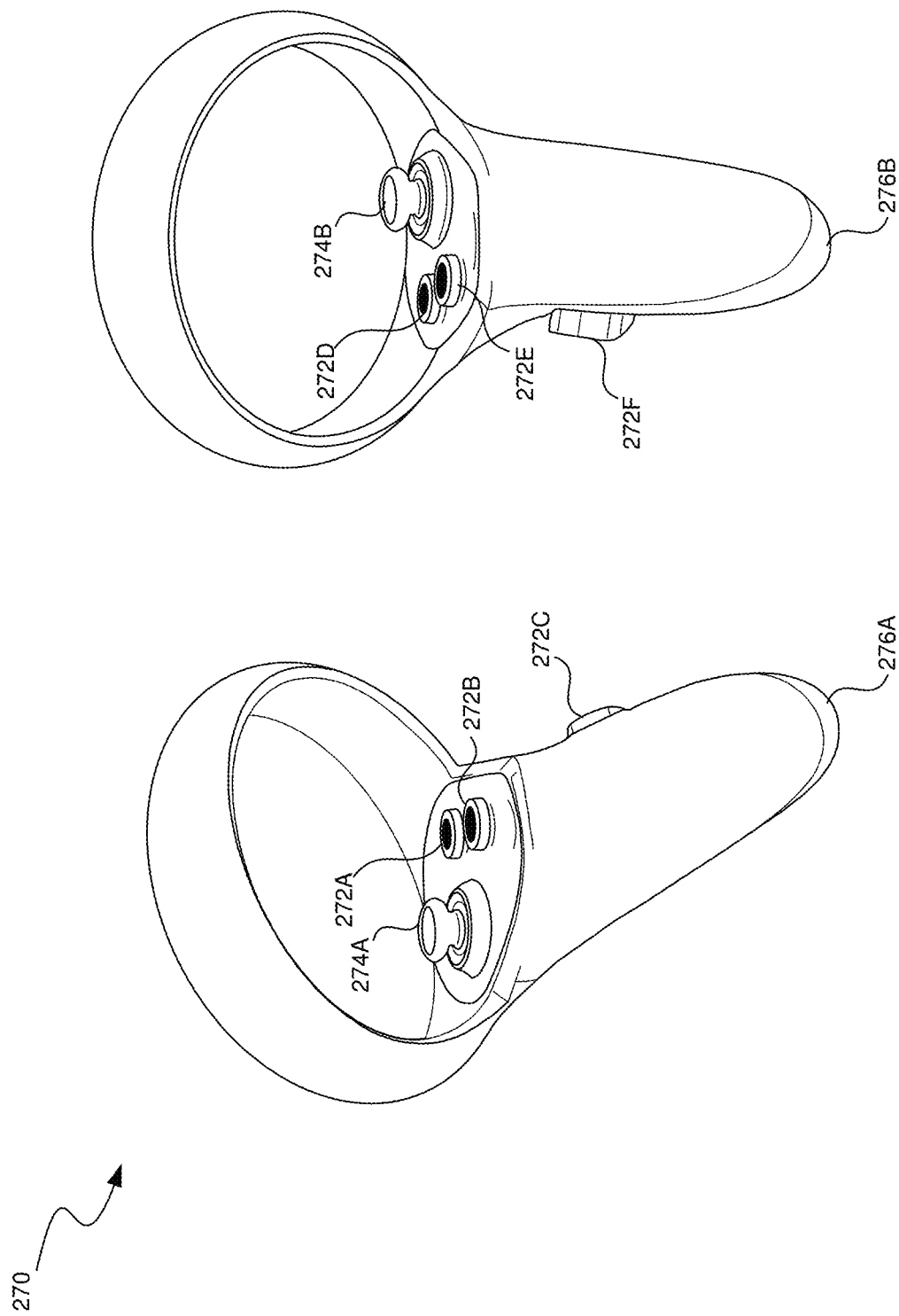
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
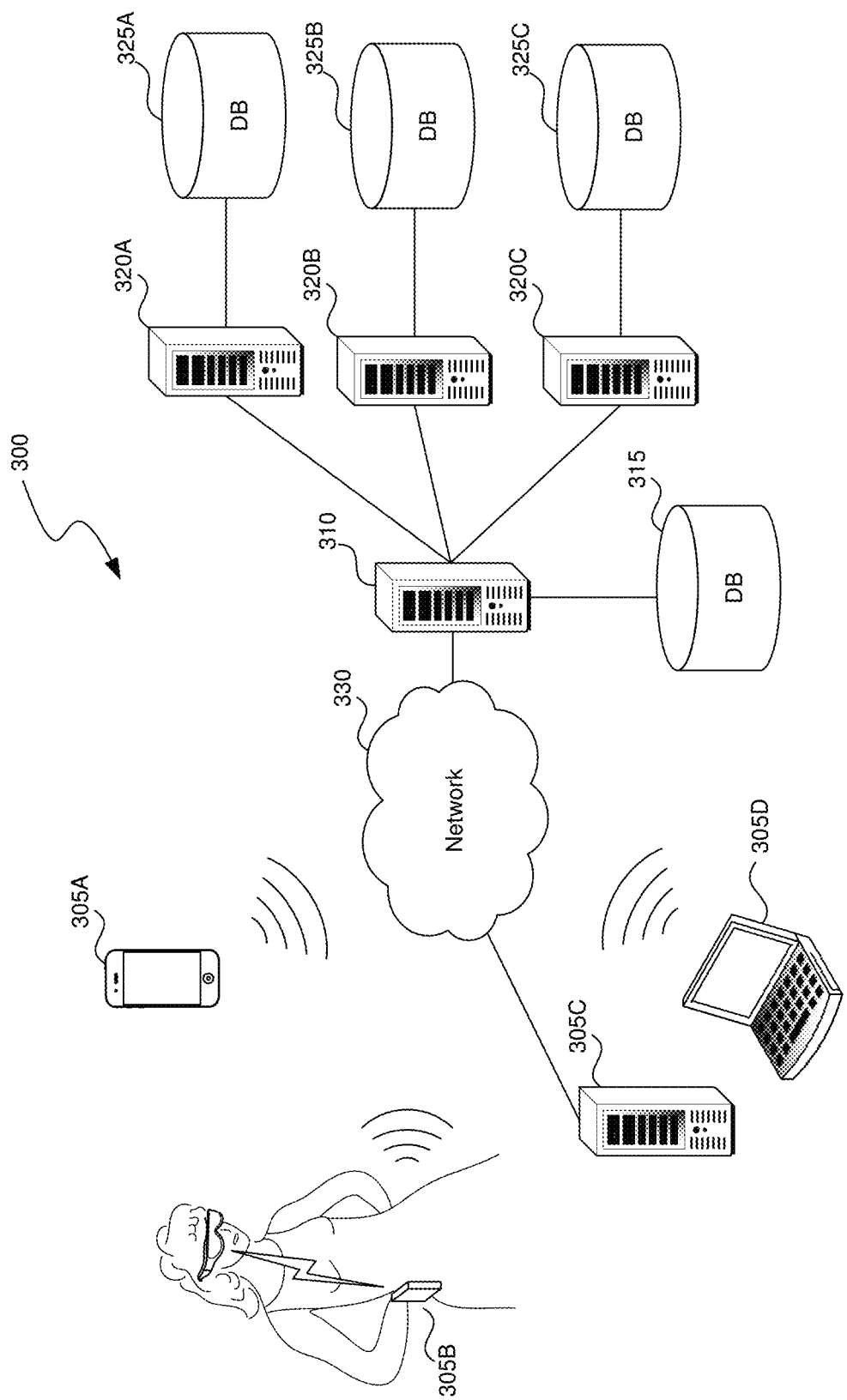
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
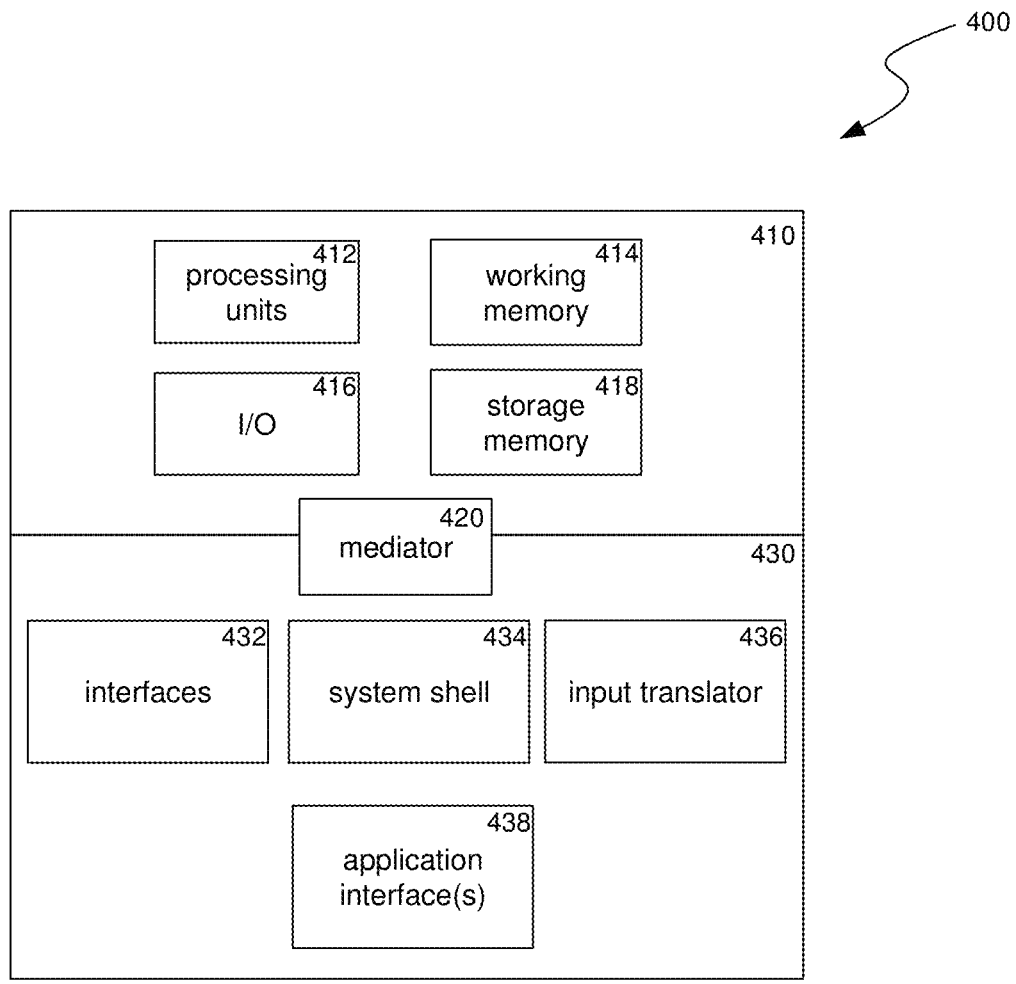
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for controlling an indicator by combining signals from multiple sensors. Specialized components 430 can include system shell 434, input translator 436, application interface(s) 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

System shell 434 can manage the software components of an XR system, such as system display components, software functionality for system display components, and interactions with remote applications. For example, a XR system can include virtual menus and built-in system functionality. System shell 434 can manage the display of virtual menus (e.g., panels), perform system functionality in response to user interactions with the virtual menus, control interactions between applications and virtual objects from various applications, provide input interaction patterns, select content to display, etc. Thus, a function of system shell 434 can be to interact with separate/remote software applications that execute at the XR system. Example remote software applications include web browsers, music players, video players, social media applications, messaging or other communication applications, third-party applications, etc.

Implementations of system shell 434 can interact with the remote software applications executing at the XR system to manage visual displays (e.g., two-dimensional virtual object displays), user interactions, computing resources, etc. In some implementations, system shell 434 can comprise several units of executing software in combination. Additional details on system shell 434 are provided below in relation to diagrams 500A and 500B of FIGS. 5A and 5B, diagram 600 of FIG. 6, and blocks 704, 706, 708, and 710 of FIG. 7.

Input translator 436 can translate XR input into application input, such as input that interacts with a two-dimensional virtual object display. Example XR input includes hand-held controller input (e.g., motion sensed input, button presses, joystick, etc.), sensed user movement (e.g., virtual hands, gestures, etc.), tracked user lower arm position (e.g., ray cast from user wrist and hand positioning), tracked user gaze (e.g., eye gaze, head gaze, etc.), and other suitable XR input. Implementations of input translator 436 detect XR collider (e.g., rays, cones, virtual hands, etc.) interactions with two-dimensional virtual objects and translate the XR input into input that is compatible with the two-dimensional virtual object. For example, a two-dimensional virtual object can be a display component for an application that executes at the XR system (e.g., application other than system shell 434). Input translator 436 can translate XR input into two-dimensional coordinates at the two-dimensional virtual object, button events, scroll events, and the like. Application events can be passed to the executing application using application interface(s) 438. In some implementations, input translator 436 can be part of system shell 434 or separate from the system shell. Additional details on input translator 436 are provided below in relation to diagrams 500A and 500B of FIGS. 5A and 5B, diagram 600 of FIG. 6, and blocks 706 and 708 of FIG. 7.

Application interface(s) 438 can comprise software structures for passing information among software. For example, application interface(s) 438 can be APIs for passing information among executing software elements at the XR system (e.g., system shell 434, remote applications, etc.). Implementations of application interface(s) 438 pass application event information from system shell 434 and/or input translator 436 to the remote applications executing at the XR system. For example, input translator 436 can detect XR input that translates to a button press event, scroll event, or other suitable application event for an executing application (e.g., remote from system shell 434) and make an API call via application interface(s) 438 to pass the event information to the executing application. Example application events include web events (JavaScript events, HyperText Markup Language (HTML) events, etc.), chromium events, Android events, and the like. In some implementations, the event information passed by application interface(s) 438 can include contextual data about a XR device/input channel state (e.g., button press state, gesture context, etc.). Additional details on application interface(s) 438 are provided below in relation to diagrams 500A and 500B of FIGS. 5A and 5B, diagram 600 of FIG. 6, and block 710 of FIG. 7.

Implementations translate XR input into virtual object input and/or triggered application events based on interactions between a XR collider (e.g., driven by XR input) and a two-dimensional virtual object display for the application. An input manager at an XR system can manage which XR input channels (e.g., hand-held controllers, virtual hands, tracked gaze, etc.) are active. Implementations can then query the input manager to identify colliders for the input channel (e.g., ray, virtual hands, cone, tracked gaze, etc.).

Implementations of an input interpreter component can detect interactions between the collider(s) controlled by the XR input channels and objects within an XR environment. For example, the input interpreter component can detect when a collider targets a component of a virtual object (e.g., the display component of an executing application) and additional XR input (e.g., user gesture, such as a hand gesture or head gesture, button press on a controller, etc.) that maps to an API call, where the API call can trigger an application event. Implementations of a system shell can initiate the mapped API call to trigger the application event at the executing application. Application events triggered via the API call(s) can include Android events (e.g., android motion event, etc.), chromium events (e.g., JavaScript web event, HTML web event, etc.), or any other suitable application event. In some implementations, the application event can alter the display of the virtual object or other components of the XR environment (e.g., inject an event in the XR environment, such as an android motion event). Any other suitable application event functionality can be implemented.

Some implementations translate ray-based XR interactions into API call(s) that trigger application event(s). A ray-based interaction can include a ray projection (i.e., straight line) from a control point along a casting direction. For example, the control point can be a palm, fingertips, a fist, a wrist, etc., and the casting direction can be along a line that passes through the control point and an origin point, such as a shoulder, eye, or hip. In other implementations, the control point can be based on other tracked body parts such as a user's eye, head, or chest. For example, the control point can be an estimated position of a center of a user's pupil and the origin point can be an estimated position of the center of a user's retina. In some cases, a graphical representation of the ray projection (the whole line or just a point where the ray hits an object) can be displayed in the artificial reality environment, while in other cases the ray projection is tracked by the XR system without displaying the ray projection. In various implementations, the ray projection can extend from the control point until it intersects with a first object or the ray projection can extend through multiple objects. In some implementations, the direction of the ray projection can be adjusted to "snap" to objects that it is close to intersecting or the ray projection can be curved up to a threshold amount to maintain intersection with such objects.

Some implementations translate XR interactions using virtual hands into API call(s) that trigger application event(s). Virtual user hands can be a virtual representation of the user's hands in a XR environment that can directly interact with XR environment elements, such as virtual objects. Implementations can translate any other suitable XR interaction into application events via one or more API calls.

Figure 5A:
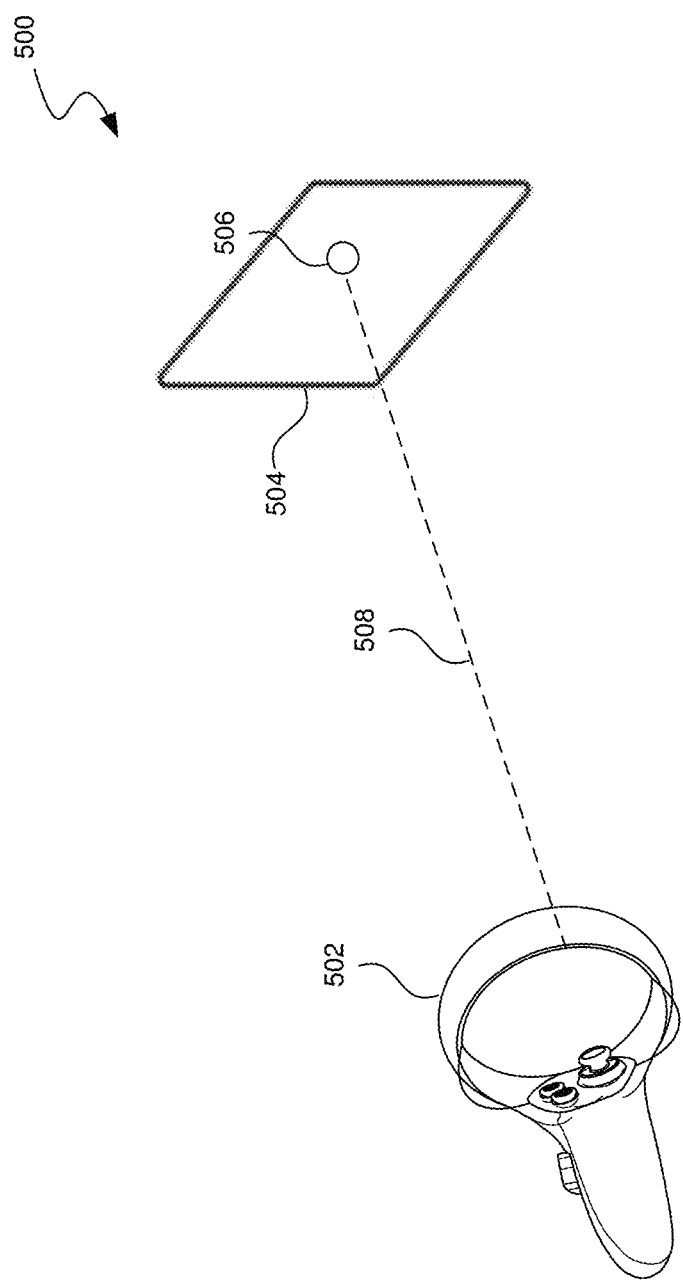
FIGS. 5A and 5B are wire diagrams illustrating a XR device relative to a two-dimensional virtual object.
Figure 5B:
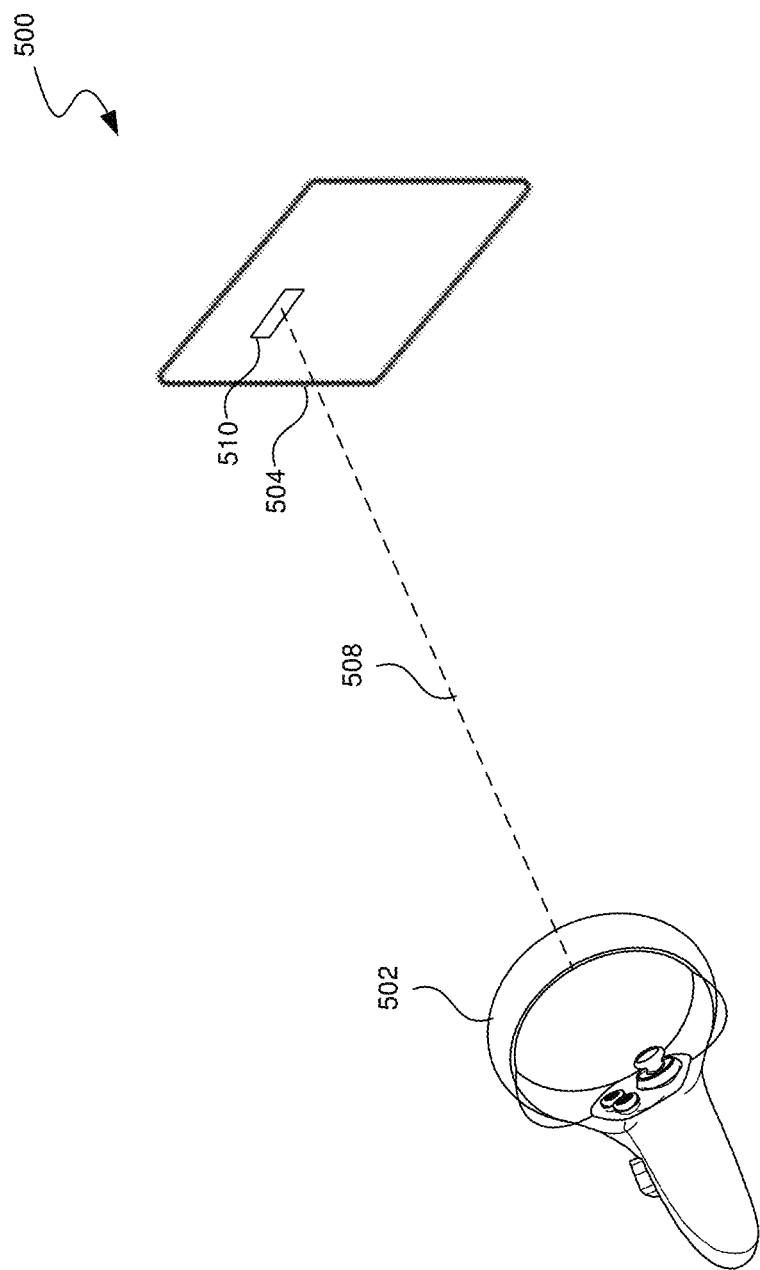

FIGS. 5A and 5B are diagrams illustrating a XR device relative to a two-dimensional virtual object. Diagram 500A includes XR device 502, two-dimensional virtual object 504, indicator 506, and ray 508. Diagram 500B includes XR device 502, two-dimensional virtual object 504, ray 508, and object component 510.

XR device 502 can be a hand-held XR device or any other suitable XR device that is part of a XR system. For example, the XR system can immerse a user in a three-dimensional XR environment that includes ray 508 and two-dimensional virtual object 504. Ray 508 can be a collider driven by input from XR device 502.

Two-dimensional virtual object 504 can be a display component for a software application executing at the XR system that is separate from the shell of the XR system. For example, two-dimensional virtual object 504 can be a remote process virtual object.

Implementations translate XR input (e.g., ray collisions, virtual hand/cone collisions, button presses on a hand-held controller, user gestures, etc.) into application level input, such as driving cursor 506 at two-dimensional virtual object 504. For example, a ray 508 can be extended from XR device 502 and indicator 506 can be controlled relative to ray 508. Ray 508 can be extended according to input signals and the sensed movement of XR device 502. Indicator 506 can be moved according to an intersection point between ray 508 and two-dimensional virtual object 504.

In some implementations, ray 508 can be cast based on lower arm tracking of a user. For example, the user's lower forearm, wrist, and/or hand can be tracked via one or more XR system sensors to determine a position of the user's lower arm, such as a wrist angle. The tracked lower arm position can be used to project ray 508 into an XR environment. In some implementations, the user's lower arm position can be tracked via XR system camera(s), a worn device (e.g., band with IMUs, neuromuscular sensors, such as an electromyography (EMG)), a hand-held controller (e.g., a device with IMU sensor(s)), and any other suitable sensors.

Diagram 500B illustrates interaction with object component 510 of two-dimensional virtual object 504. For example, object component 510 can be a virtual button, scrollable panel, or any other suitable component. Implementations can detect when ray 508 intersects with two-dimensional virtual object 504 and translate this XR input into an API call that triggers an application event. Example XR input that triggers an application event includes detected motion that represents a push action (e.g., back and forth motion), a button press (e.g., on a hand-held device), a detected gesture (e.g., pinch gesture, flick gesture, double push hand/finger gesture, etc.), movement of a ray (that corresponds to cursor movement), or any other suitable input. In response, implementations can initiate an API call to pass event information to the executing application that supports two-dimensional virtual object 504. The executing application can in turn perform application functionality in response to the event information, such as raise a button press action that triggers an application function (e.g., plays a music player, selects a menu item, plays a video, navigates to a webpage, etc.).

Figure 6:
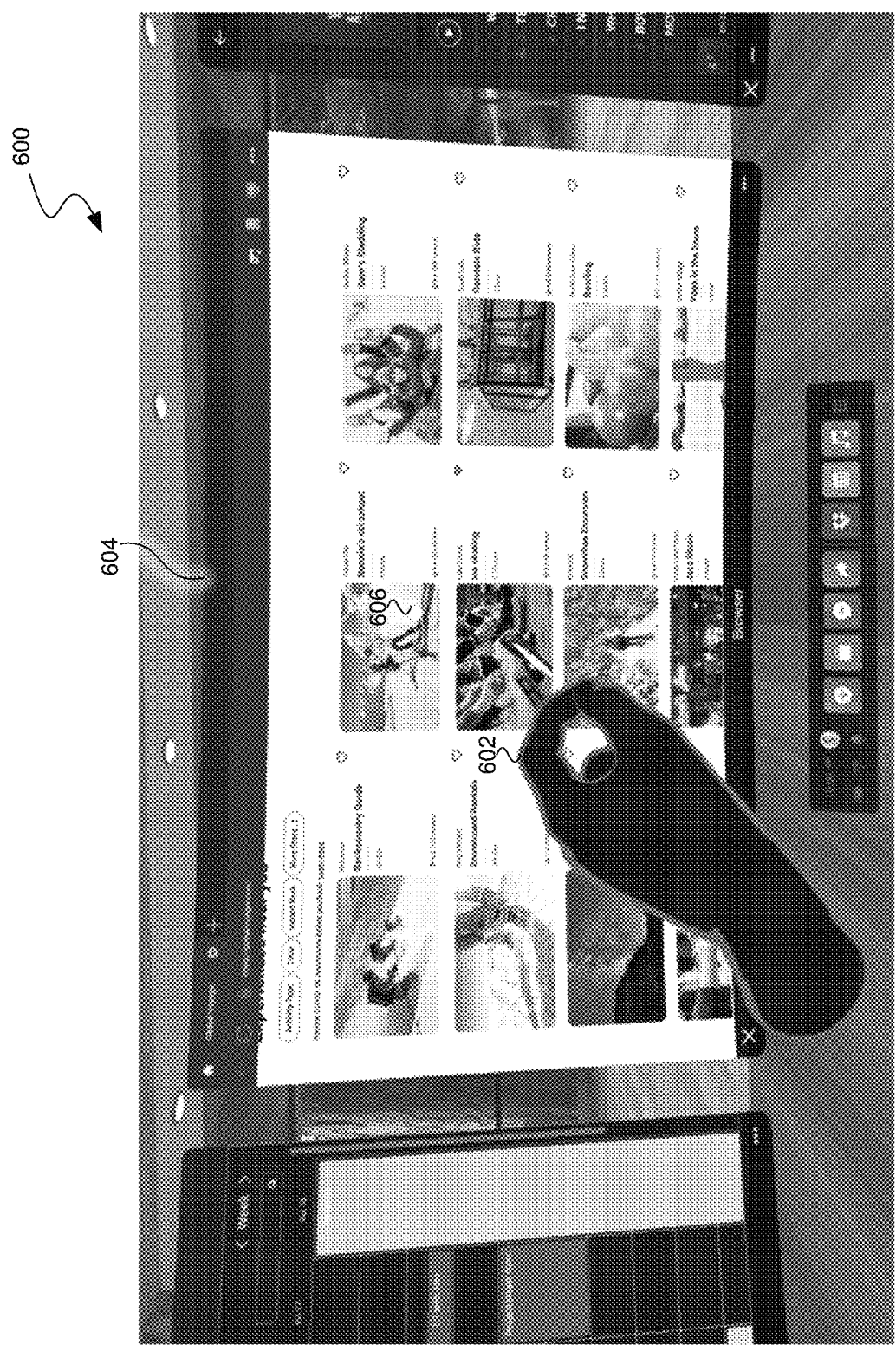
FIG. 6 is a diagram illustrating a user interacting with a two-dimensional object within an artificial reality environment.

In some implementations, the XR device interaction/collider comprises a sensed user movement (e.g., virtual user hands). FIG. 6 is a diagram illustrating a user interacting with a two-dimensional object within an artificial reality environment. XR environment 600 includes virtual hands 602, two-dimensional virtual object 604, and indicator 606. An XR system can immerse a user in XR environment 600. Virtual hands 602 can represent virtual hands of the user that mirror sensed movement of the user's hands (e.g., computer vision tracking of the user's hands). The user can interact with components of XR environment 600 via virtual hands 602.

For example, a ray can be extended based on the orientation of virtual hands 604 and indicator 606 can be controlled relative to the ray. Indicator 606 can be moved according to an intersection point between the ray and two-dimensional virtual object 604. In another example, an orientation for virtual hands 604 can be translated into two-dimensional coordinates at virtual object 604 in any other suitable manner. For example, virtual hands 602 can comprise a three-dimensional volume, tracked user hand movement can be translated into virtual hands 602 movement within XR environment 600, and collision(s) between virtual hands 602 and virtual object 604 can be translated into two-dimensional coordinates at virtual object 604 and any other suitable user input. Implementations can detect when virtual hands 602 target components of two-dimensional virtual object 604 and when user input (represented by virtual hands 602) corresponds to a translated API call (that triggers an application event). Example user input that triggers an application event includes detected motion that represents a push action (e.g., back and forth motion), a detected flick gesture, a detected pinch gesture, movement of a ray that intersects with another virtual object, or any other suitable input.

In response to the detection that virtual hands 602 target an object component of two-dimensional virtual object 604 and user input represented by virtual hands 602 maps to a API call, implementations can initiate the mapped API call to pass the event information to the executing application that supports two-dimensional virtual object 604. The executing application can in turn perform application functionality in response to an event triggered by the API call, such as a button press action that triggers an application function (e.g., plays a music player, selects a menu item, plays a video, navigates to a webpage, etc.).

Implementations can translate XR input (relative to a two-dimensional virtual object) into any suitable application events using mapped API calls from the input translator to executing application(s) (e.g., that provide content for the two-dimensional virtual object). For example, the mapped API(s) can be structured to include a variety of calls and parameters for passing different types of event information. In some implementations, different XR interaction(s) relative to the virtual object can be mapped to different API call(s) that trigger different application event(s) and/or application functionality at the executing application.

For example, API call(s) can trigger and/or pass an application event at a two-dimensional coordinate of an executing application, such as the two-dimensional coordinates of a virtual object (e.g., panel) targeted by XR interaction(s) (e.g., ray collision, virtual hands collision, etc.) mapped to the API call(s). The application event can be a onClick selection event (e.g., event triggered by clicking a user interface element), onTouch selection event, onFocus event, onHover or mouseover event (e.g., event triggered by hovering a cursor over a user interface element), and the like. For example, one or more XR input interactions mapped to the API call(s) that trigger the application event can include: a targeting interaction that targets a two-dimensional coordinate at a virtual object (e.g., ray collision, virtual hands collision, etc.) and a gesture or movement interaction that is mapped to a specific event, such as a button push event (e.g., hand gesture, such as a push motion, pinch, flick, snap, etc., head gesture, such as a head nod, tilt, repeated up-and-down or side-to-side motion, etc., etc.). One or more API calls in response to the one or more XR input interactions can trigger, at the executing application(s), the button push event at the two-dimensional coordinates. In another example, the application event(s) can be any other suitable application event(s) that corresponds to API call(s) mapped to the XR targeting interaction and XR gesture or movement interaction.

In this example, the translated XR input and API call(s) can provide the executing application event information that is compatible with 2D input channels, such as a mouse input, touch input via a trackpad or touchscreen, a keyboard, or any combination thereof. For example, in traditional 2D input channels, onClick application events maybe triggered in response to clicking a mouse, double touching a trackpad, touching a touch screen, etc. The translated XR input and API call(s) can provide the executing application event information and/or raise certain actions (e.g., button click actions, keyboard actions, touch actions, etc.) so that XR input effectively interacts with the executing application. In some implementations, the API call(s) can pass event information to the executing application, and the application events triggered in response to the API call(s) can be triggered in response to one or more listeners detecting the passed event information. For example, an onClick event at an application can be triggered in response to a listener detecting a click or touch event. In some implementations, the listener(s) can be any suitable listener compatible with web events, chromium events, Android events, or any other suitable listener.

Implementations translate XR input into API call(s) that can raise actions/events that are expected by these listeners. For example, XR input that targets a user interface element and represents a user gesture can be translated into API call(s) that raise (at the execution application) a button click action/event, a hover action/event, a focus action/event, etc. relative to the user interface elements. Listener(s) associated with the executing application can then detect the action(s)/ event(s) and perform application functionality in response, such as perform an application event (e.g., perform any suitable onClick event, onFocus event, onBlur event, noMouseover event, onHover event, etc.).

In some implementations, the application event(s) can cause application functionality at the executing application. For example, the application functionality can include: selecting a radial button, selecting a check box, dynamically displaying a menu item, image, or other suitable user interface element (e.g., in response to a mouseover or hover event), playing a video, animating one or more content items display at the virtual object, etc. For example, a XR targeting interaction and XR gesture can be mapped to first API call(s), and the first API call(s) can trigger an onHover application event (defined relative to a user interface element targeted via the XR targeting interaction) at the executing, application, where the onHover application event causes one or more user interface elements (e.g., menus, images, text, etc.) to be dynamically displayed at the virtual object. In this example, alternatives to the onHover application event include onFocus, onBlur, OnRightClick (e.g., relative to a moue), onScrollWheelClick (e.g., relative to a mouse), onMouseOver, onMouseOut, and other suitable application events.

In another example, a series of XR interactions, mapped API calls, and resultant application events can correspond to a sequence that performs application functionality, such as resizing or moving a user interface element. For example, first XR interaction(s) can grab a boundary of a user interface element (e.g., edge of a panel), second XR interaction(s) can move the boundary of the user interface element, and third XR interaction(s) can release the boundary of the use interface element to resize the element. Moving a user interface element can include moving a slider component of a user interface element, moving a window, image, or other user interface element within the virtual object (e.g., panel), and the like.

Those skilled in the art will appreciate that the components illustrated in FIGS. 1-4, 5A, 5B, and 6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
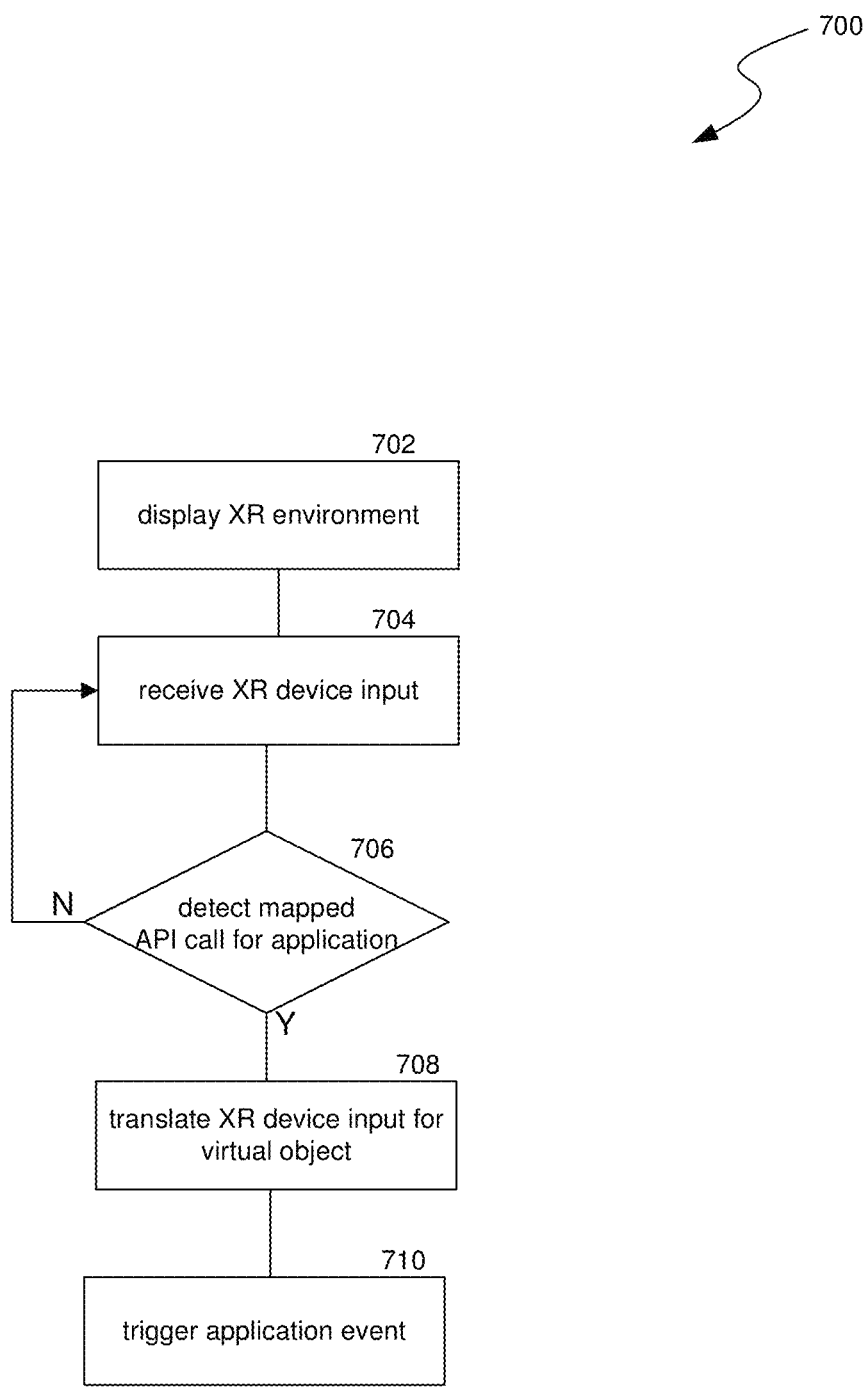
FIG. 7 is a flow diagram illustrating a process used in some implementations of the present technology for translating artificial reality input for two-dimensional virtual objects.

FIG. 7 is a flow diagram illustrating a process used in some implementations of the present technology for translating artificial reality input for two-dimensional virtual objects. In some implementations, process 700 can be performed by an XR system or any other suitable system configured to display a virtual object to a user and control an indicator at the target via user inputs. In some implementations, process 700 can be triggered when a virtual object is displayed to a user in an XR environment.

At block 702, process 700 can display a XR environment to a user. For example, a XR system can display an immersive three-dimensional XR environment to a user. In some implementations, the XR environment can include one or more two-dimensional virtual objects, such as a panel. The two-dimensional virtual object can be a display component of an application running at the XR system.

At block 704, process 700 can receive XR input. For example, the XR input can be XR controller input (e.g., controller motion, button press, joystick, etc.), tracked three-dimensional user movement input (e.g., user had movement, a particular gesture, gaze movement, eye movement, a blink, etc.), or any combination thereof. Implementations of an input interpreter component can receive and manage the XR input.

At block 706, process 700 can determine whether the input is directed at the two-dimensional virtual object and whether the input maps to one or more API calls. Process 700 can determine whether the input is directed at the two-dimensional virtual object based on colliders e.g., a determination that a user's gaze (for gaze input) is directed at the two-dimensional virtual object or based on a ray, controller, or hand (for hand or controller based input) intersects with the two-dimensional virtual object.

Process 700 can determine whether the XR input maps to API call(s) based on whether the XR input matches any mapped API call(s). For example, the XR input can include an input type such as a cursor movement, click or select action, swipe, button press, blink, gesture, etc., various of which can be mapped to API call(s). In some implementations, the API call(s) can correspond to application events for the executing application. For example, user gestures (e.g., pinch gestures, flick gestures, push/select gestures, forward/backward motion etc.), controller button presses, eye blinks, etc. can be mapped to API call(s) that cause a selection or "click" event types at the executing application and ray movements or hand movements can be mapped to API call(s) that cause cursor movement event types at the executing application. When the input is not directed at a 2D virtual object or the XR input is not mapped to an application, process 700 can loop back to block 704, otherwise process 700 can proceed to block 708.

At block 708, process 700 can translate the received XR input into the application event of the mapped type. For example, the input interpreter component can translate the XR input into position coordinates relative to the two-dimensional virtual object and supply those as cursor movement information, click event information, click and drag event information, release event information, etc., at the identified coordinates. Implementations of the input interpreter component can detect when a virtual object component is targeted and when XR input initiates a mapped API call that triggers application event(s) at the executing application.

At block 710, the application event can be triggered by passing the triggered event from a XR system shell to the executing application. For example, the system shell can initiate an API call that passes event information from the system shell to the executing application (e.g., which is remote from the XR system shell). In response, the executing application can perform an application function, such as scroll a portion of the two-dimensional virtual object, play audio or video, navigate to a webpage, or any other suitable application function.

In some implementations, the two-dimensional virtual object comprises a panel and the XR input comprise at least a first XR interaction that targets a user interface element displayed by the panel. In some implementations, the XR interactions comprise at least a second XR interaction that corresponds to a user gesture, and the one or more API calls translated from the XR input comprise at least context representative of the user gesture. For example, the application event triggered by the one or more API calls comprises an event triggered by a button press at the targeted user interface element, and the user gesture comprises: a user pinch gesture, a user selection movement, or any combination thereof. In some implementations, the application event triggered by the one or more API calls comprises an event triggered by a hover action or focus action at the targeted user interface element and the user gesture comprises: a user pinch gesture, a user selection movement, or any combination thereof.

In some implementations, the one or more API calls translated from the XR input comprise action information that triggers the one or more application events. For example, the mapping of the XR input to the one or more API calls can define the action information, the API calls and action information can raise an action event corresponding to the action information at the executing application, and the application event that causes the change in content displayed at the 2D virtual object can be triggered in response to the raised action event. Example raised action event(s) comprises a button click action, a hover action, a mouseover action, a focus action, a blur action, or any combination thereof. In some implementations, application event is triggered by a listener that detects the raised action event.

In some implementations, the change in content displayed at the 2D virtual object comprises one or more of: display of a new image, display of next text, playing a video, moving a display location of a sub-element of the targeted user interface element, moving a display location of the targeted user interface element, resizing the user interface element, or any combination thereof. In some implementations, the change in content displayed at the 2D virtual object comprise one or more of: removing a display of a previously displayed image, removing a display of previously displayed text, removing a display of a playing video, removing the user interface element, or any combination thereof.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for translating artificial reality (XR) input for two-dimensional virtual objects, the method comprising:
   receiving, at a XR system from a user, XR input comprising one or more XR interactions, wherein the XR system displays an immersive three-dimensional environment to the user, and the XR input comprises one or more of three-dimensional (3D) XR controller input, tracked user movement input, or any combination thereof;
   determining, by one or more system shell applications, that the one or more XR interactions are directed at a two-dimensional (2D) virtual object and that the one or more XR interactions are mapped to one or more application programming interface (API) calls to a target executing application in control of the 2D virtual object, wherein the target executing application is remote from the one or more system shell applications;
   translating the XR input into the mapped one or more API calls for the target executing application, wherein the one or more API calls provide 2D input to the target executing application comprising at least a 2D location of the XR input relative to the 2D virtual object and mapped action information; and
   triggering, via the one or more API calls, 2D location, and mapped action information, one or more application events at the target executing application, wherein the application events cause a change in content displayed at the 2D virtual object.

2. The method of claim 1, wherein the two-dimensional virtual object comprises a panel and the one or more XR interactions comprise at least a first XR interaction that targets a user interface element displayed by the panel.

3. The method of claim 2, wherein the one or more XR interactions comprise at least a second XR interaction that corresponds to a user gesture, and the one or more API calls translated from the XR input comprise at least context representative of the user gesture.

4. The method of claim 3, wherein the one or more application events triggered by the one or more API calls comprise an event triggered by a button press at the targeted user interface element, and the user gesture comprises: a user pinch gesture, a user selection movement, or any combination thereof.

5. The method of claim 4, wherein the mapping of the one or more XR interactions to the one or more API calls defines the action information, the API calls and the mapped action information raise an action event corresponding to the mapped action information at the target executing application, and the application event that causes the change in content displayed at the 2D virtual object is triggered in response to the raised action event.

6. The method of claim 5, wherein the raised action event comprises a button click action, a hover action, a mouseover action, a focus action, a blur action, or any combination thereof.

7. The method of claim 3, wherein the application event triggered by the one or more API calls comprises an event triggered by a hover action or focus action at the targeted user interface element and the user gesture comprises: a user pinch gesture, a user selection movement, or any combination thereof.

8. The method of claim 2, wherein the mapped action information that triggers the one or more application events.

9. The method of claim 2, wherein the change in content displayed at the 2D virtual object comprises one or more of: display of a new image, display of next text, playing a video, moving a display location of a sub-element of the targeted user interface element, moving a display location of the targeted user interface element, resizing the user interface element, or any combination thereof.

10. The method of claim 2, wherein the change in content displayed at the 2D virtual object comprise one or more of: removing a display of a previously displayed image, removing a display of previously displayed text, removing a display of a playing video, removing the user interface element, or any combination thereof.

11. A non-transitory computer-readable storage medium storing instructions that, when executed by a computing system, cause the computing system to translate artificial reality (XR) input for two-dimensional virtual objects, the process comprising:
  receiving, at a XR system from a user, XR input comprising one or more XR interactions, wherein the XR system displays an immersive three-dimensional environment to the user;
  determining, by one or more system shell applications, that the one or more XR interactions are directed at a two-dimensional (2D) virtual object and that the one or more XR interactions are mapped to one or more application programming interface (API) calls to a target executing application in control of the 2D virtual object, wherein the target executing application is remote from the one or more system shell applications;
  translating the XR input into the mapped one or more API calls for the target executing application, wherein the one or more API calls provide 2D input to the target executing application comprising at least a 2D location of the XR input relative to the 2D virtual object and mapped action information; and
  triggering, via the one or more API calls, 2D location, and mapped action information, one or more application events at the target executing application, wherein the application events cause a change in content displayed at the 2D virtual object.

12. The non-transitory computer-readable storage medium of claim 11, wherein the two-dimensional virtual object comprises a panel and the one or more XR interactions comprise at least a first XR interaction that targets a user interface element displayed by the panel.

13. The non-transitory computer-readable storage medium of claim 12, wherein the one or more XR interactions comprise at least a second XR interaction that corresponds to a user gesture, and the one or more API calls translated from the XR input comprise at least context representative of the user gesture.

14. The non-transitory computer-readable storage medium of claim 13, wherein the one or more application events triggered by the one or more API calls comprise an event triggered by a button press at the targeted user interface element, and the user gesture comprises: a user pinch gesture, a user selection movement, or any combination thereof.

15. The non-transitory computer-readable storage medium of claim 14, wherein the mapping of the one or more XR interactions to the one or more API calls defines the action information, the API calls and the mapped action information raise an action event corresponding to the mapped action information at the executing application, and the application event that causes the change in content displayed at the 2D virtual object is triggered in response to the raised action event.

16. The non-transitory computer-readable storage medium of claim 15, wherein the raised action event comprises a button click action, a hover action, a mouseover action, a focus action, a blur action, or any combination thereof.

17. The non-transitory computer-readable storage medium of claim 13, wherein the application event triggered by the one or more API calls comprises an event triggered by a hover action or focus action at the targeted user interface element and the user gesture comprises: a user pinch gesture, a user selection movement, or any combination thereof.

18. The non-transitory computer-readable storage medium of claim 12, wherein the mapped action information that triggers the one or more application events.

19. The non-transitory computer-readable storage medium of claim 12, wherein the change in content displayed at the 2D virtual object comprises one or more of: display of a new image, display of next text, playing a video, moving a display location of a sub-element of the targeted user interface element, moving a display location of the targeted user interface element, resizing the user interface element, or any combination thereof.

20. A computing system for translating artificial reality (XR) input for two-dimensional virtual objects, the computing system comprising:
  one or more processors; and
  one or more memories storing instructions that, when executed by the one or more processors, cause the computing system to perform a process comprising:
    receiving, at a XR system from a user, XR input comprising one or more XR interactions, wherein the XR system displays an immersive three-dimensional environment to the user;
    determining, by one or more system shell applications, that the one or more XR interactions are directed at a two-dimensional (2D) virtual object and that the one or more XR interactions are mapped to one or more application programming interface (API) calls to a target executing application in control of the 2D virtual object, wherein the target executing application is remote from the one or more system shell applications;

translating the XR input into the mapped one or more API calls for the target executing application, wherein the one or more API calls provide 2D input to the target executing application comprising at least a 2D location of the XR input relative to the 2D virtual object and mapped action information; and triggering, via the one or more API calls, 2D location, and mapped action information one or more application events at the target executing application, wherein the application events cause a change in content displayed at the 2D virtual object.

\* \* \* \* \*